W. B. HUBARD.
Corn Harvester.
No. 91,444. Patented June 15, 1869.
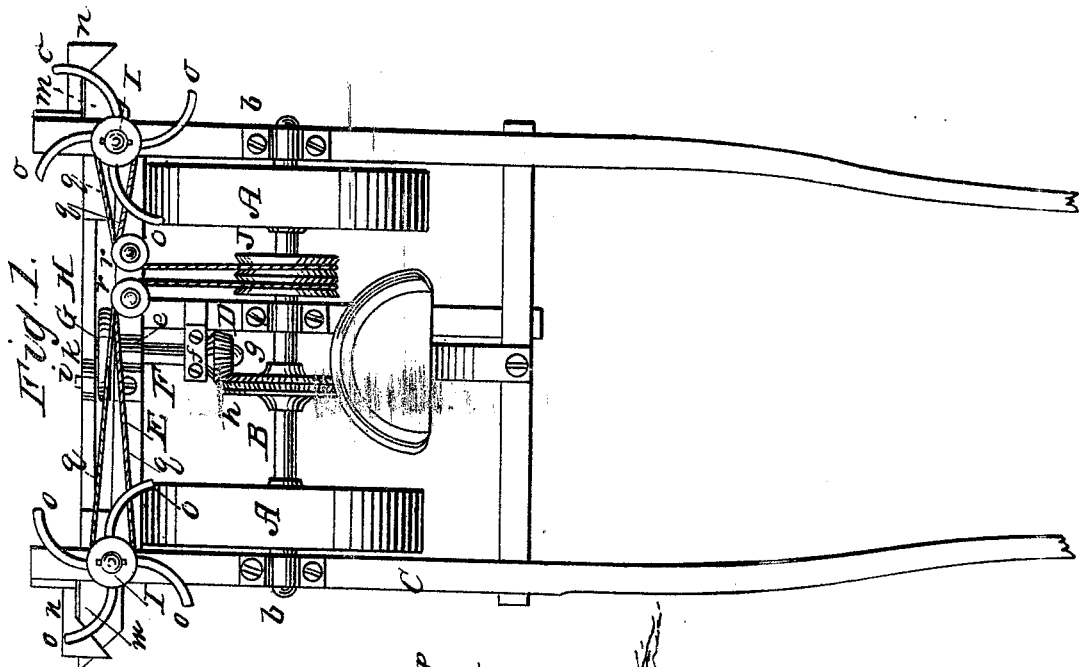
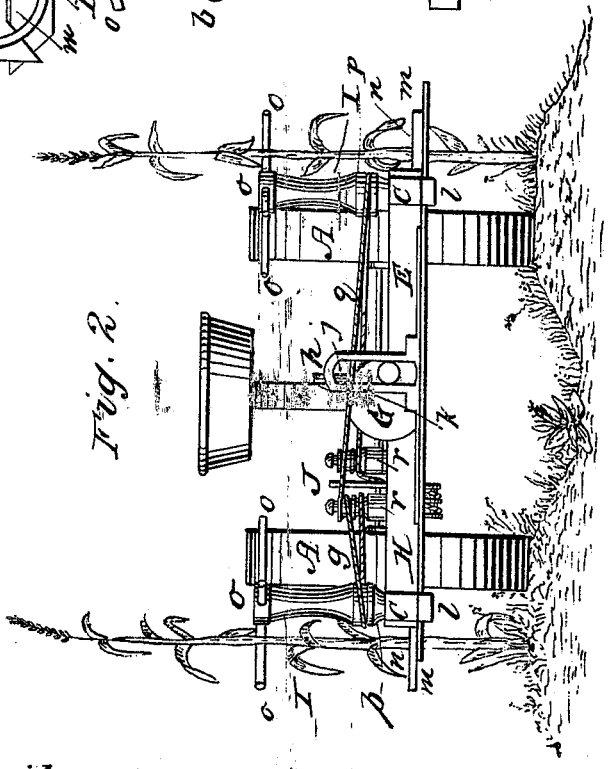
Witnesses
William Wansleben
John P. Suwerkrop
Inventor
William B Hubard
Alex. A. C. Klaucke & Co
his Attorneys

UNITED STATES PATENT OFFICE.

WILLIAM B. HUBARD, OF ARRINGTON DEPOT, VIRGINIA.

IMPROVEMENT IN CORN-HARVESTERS.

Specification forming part of Letters Patent No. 91,444, dated June 15, 1869.

*To all whom it may concern:*

Be it known that I, WILLIAM B. HUBARD, of Arrington Depot, in the county of Nelson and State of Virginia, have invented a new and useful Improvement in Corn-Harvesters; and I do hereby declare the following to be a full and correct description of the same, sufficient to enable others skilled in the art to which my invention appertains to fully understand and construct the same, reference being had to the accompanying drawings, which make part of this specification, and in which—

Figure 1 is a top view of my improved corn-harvester, and Fig. 2 is a rear elevation of the same.

Like letters of reference indicate like parts in both figures.

The nature of my invention consists in placing the wheels on the inside of the harvester-frame in such a manner that the harvester will pass between the rows of corn and cut two rows at the same time; also, in the peculiar shape of the cutting-knives, and in the manner of operating them; also, in the construction and operation of the reels which feed the corn to the knives.

A in the drawings may represent the wheels of a corn-harvester attached to the axle B, which revolves in bearings $b$ on the draft-poles C, the rear ends of which form part of the frame. The cross-beam D is arranged to one side of the center of the frame, to allow of the arrangement, on the center of the rear beam E of the frame, of a bearing, $e$, for the short shaft F, which plays in another bearing, $f$, extending sidewise from beam D.

At the inner end of shaft F is a bevel-pinion, $g$, gearing with a bevel-gear wheel, $h$, on axle B. The outer end of shaft F carries a disk, G, provided with a crank-pin, $i$, which operates in slot $j$ in standard $k$ of the reciprocating knife-bar H. This latter moves in bearings $l$ on the under side of poles C, and carries the beveled knives $m$, which extend sidewise beyond the frame and slide under beveled knives $n$ secured on the outside of the rear ends of poles C, in such a manner that between the two knives $m$ $n$ a shear cut is obtained.

On the rear part of poles C are pivoted vertical reels I, provided at their top with bent arms $o$, which seize the stalks and hold them against the knives while the latter perform the cut. These reels have, near their lower ends, grooves $p$, for endless bands or ropes $q$, which, passing over vertical doubly-grooved pulleys $r$, pass around the wheel J, having two grooves, and being rigidly secured on axle B. By these means a rotary motion is imparted to the reels as the harvester advances in its work.

The operation of my device is very simple and easily understood. The harvester being drawn between two rows of corn, the stalks are seized by the arms $o$ of reels I, and held against the knives $m$ $n$ to be cut.

Having thus described my invention, what I claim as new, and desire to secure by Letters Patent, is—

The combination and arrangement of the vertical beveled reciprocating knives $m$ with like stationary knives $n$, bevel-gear wheel $h$, bevel-pinion $g$, shaft F, disk G, pin $i$, slotted standard $k$, reciprocating knife-bar H, reels I, provided with arms $o$, grooves $p$, bands or ropes $q$, vertical grooved pulleys $r$, and grooved wheel J on axle A, all arranged to operate as herein described.

The above specification of my improvement in corn-harvesters signed this 14th day of October, 1868.

WM. B. HUBARD.

Witnesses:
ALEXR. A. C. KLAUCKE,
D. OURAND.